United States Patent [19]

Kim et al.

[11] Patent Number: 4,790,986

[45] Date of Patent: Dec. 13, 1988

[54] METHOD AND APPARATUS TO PRODUCE A HOT FLUIDIZING GAS

[75] Inventors: Jonathan J. Kim, Williamsville; Viswanathan Venkateswaran; Randolph Kujawa, both of Grand Island, all of N.Y.

[73] Assignee: Stemcor Corporation, Cleveland, Ohio

[21] Appl. No.: 918,911

[22] Filed: Oct. 15, 1986

[51] Int. Cl.$^4$ ............................................. C01B 31/00
[52] U.S. Cl. .................... 423/659; 34/57 A; 422/146; 423/412; 423/DIG. 16; 432/15; 432/58
[58] Field of Search ............... 423/DIG. 16, 412, 659; 432/15, 58; 34/57 A

[56] References Cited

U.S. PATENT DOCUMENTS

| | | | |
|---|---|---|---|
| 2,525,925 | 10/1950 | Marshall | 423/DIG. 16 |
| 2,528,098 | 10/1950 | White | 432/58 |
| 2,647,738 | 8/1953 | Trainer | 432/58 |
| 2,698,171 | 12/1954 | Schoenmakers et al. | 422/146 |
| 2,786,280 | 3/1957 | Gishler et al. | 423/DIG. 16 |
| 2,870,002 | 1/1959 | Johnson | 423/DIG. 16 |
| 3,151,944 | 10/1964 | Stevens et al. | 422/146 |
| 3,542,347 | 11/1970 | Goldney et al. | 432/15 |
| 4,035,152 | 7/1977 | Yang et al. | 432/15 |
| 4,160,813 | 7/1979 | Markel et al. | 423/DIG. 16 |
| 4,371,033 | 2/1983 | Stendahl | 422/146 |
| 4,473,534 | 9/1984 | Tanaami et al. | 432/58 |

FOREIGN PATENT DOCUMENTS

| | | | |
|---|---|---|---|
| 521842 | 2/1956 | Canada | 423/DIG. 16 |
| 797756 | 1/1981 | U.S.S.R. | 423/DIG. 16 |
| 1045626 | 10/1966 | United Kingdom | 423/15 |

Primary Examiner—John Doll
Assistant Examiner—Wayne A. Langel
Attorney, Agent, or Firm—Lorusso & Loud

[57] ABSTRACT

A fluid bed reactor for treatment of refractory materials with a hot fluidizing gas and a method to use same. Both the refractory materials and the fluidizing gas are introduced from the top of the reactor. Unusually high reaction temperatures of up to 2000° C. are maintained in the reaction chamber due to the presence of heating elements within the reactor and due to countercurrent heat transfer.

3 Claims, 2 Drawing Sheets

4,790,986

METHOD AND APPARATUS TO PRODUCE A HOT FLUIDIZING GAS

BACKGROUND OF THE INVENTION

The present invention is an improved method and apparatus to produce a hot fluidizing gas to effect treatment on a material. The method and apparatus are particularly useful for the continuous reaction of hot nitrogen gas for conversion of agglomerates of aluminum oxide and carbon to high purity, ultra-fine aluminum nitride powder.

A method presently known to react a gas with a particulate solid is a fluid bed reactor. In that reactor, a gas is introduced at the bottom of a reaction vessel and travels upward to fluidize particulate material or agglomerates that are introduced from the top of the reaction vessel. Prior fluid bed reactors and methods have several disadvantages when a hot fluidizing gas is required such as when reacting aluminum oxide and carbon with nitrogen to form aluminum nitride. In order to have a heated fluidizing gas to effect treatment, the gas must be at the proper temperature when in the reaction chamber. There are two methods to achieve proper gas temperature in the reaction chamber. One method is to heat the gas externally with no heating occuring in the reactor. The second method is to heat the gas internally. Either method has some disadvantages.

Preheating a gas to high temperature (over 1000° C.) before it enters the fluid bed reactor is very difficult because of the problems of transporting a gas this hot. Indeed, preheating a fluidizing gas to a temperature of 1500° C. or more has not been commercially practical. On the other hand, if the gas is not preheated, but is instead heated within the reactor, an insufficiently heated gas can quench the reaction, an acute problem when the process involves an endothermic reaction. Heating the gas within the reaction chamber has not been entirely satisfactory, mainly because of the difficulty of maintaining a high constant temperature in a continuous reaction.

SUMMARY OF THE INVENTION

The problems of the prior art have been solved in an apparatus which preheats the fluidizing gas within the apparatus before it reaches the reaction zone. A method and apparatus for the production of hot fluidizing gas is described herein. The apparatus comprises a fluid bed reactor in which the particulate matter to be treated is introduced at the top of the reaction chamber. The fluidizing gas is also introduced from the top of the reaction chamber through a conduit and travels downward within the conduit where it is preheated before contacting the reactant solids. The fluidizing gas heats up to the desired reaction temperature before entering the reaction chamber. This aids in maintaining a constant temperature between the gas and the agglomerate for better control of the quality of the product. This invention efficiently utilizes energy since the exhaust gas also performs the function of preheating the incoming fluidizing gas by countercurrent heat transfer. The fluidizing gas is heated to and maintained at a constant temperature of up to 2000° C.

Accordingly, it is an object of the present invention to furnish the method and apparatus for the preheating of fluidizing gas at controllable temperatures within the reaction chamber.

It is another object of the present invention to produce a method and apparatus for the preheating of hot fluidizing gas at controllable temperatures of up to 2000° C., which have not been previously possible, for treatment of refractory materials.

It is a further object of the present invention to provide a method and apparatus for the continuous preheating of hot fluidizing gas, for the treatment of refractory materials, that can preheat the gas within the apparatus and maintain the gas at the controllable temperature in the reaction chamber.

Still another object of the present invention is to produce a method and apparatus for the continous preheating of hot fluidizing gas for the production of high purity, ultra-fine aluminum nitride powder.

Yet another object of the present invention is to maintain the structural integrity of a fluid bed reactor even at the high temperatures necessary for the production of refractory materials.

These and other objects of the present invention are further described in reference to the following detailed description of the invention, taken together with the drawing in which like references numbers refer to like members in the various figures.

DETAILED DESCRIPTION OF THE INVENTION

Figure 1:
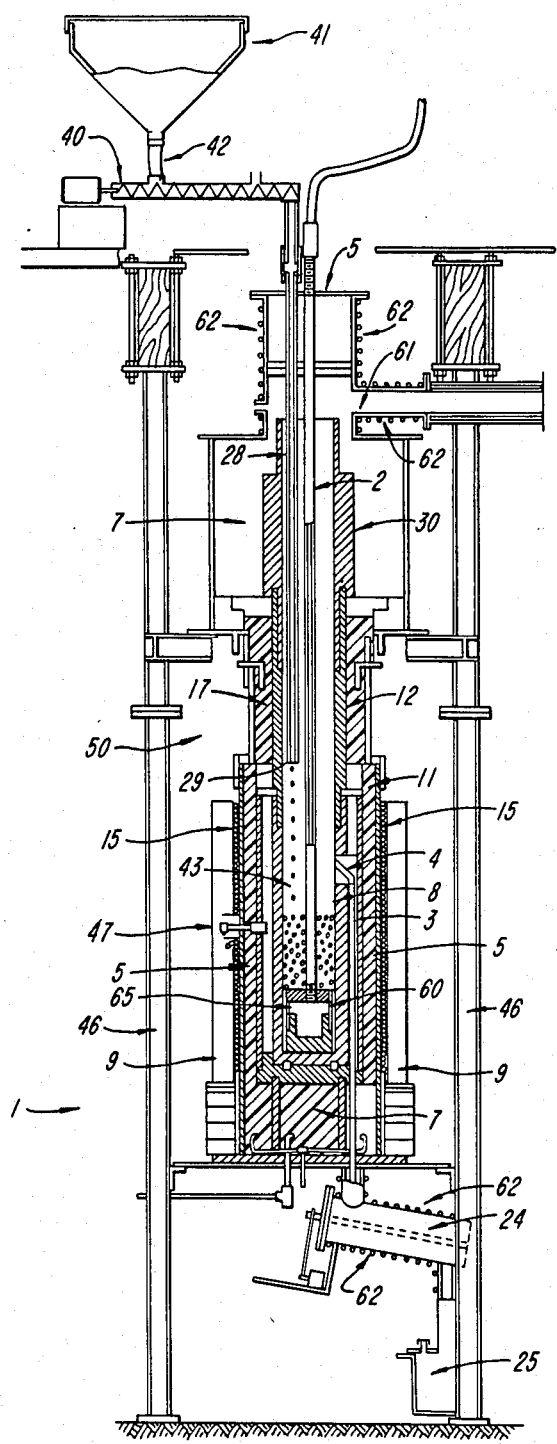
FIG. 1 is a vertical sectional view of the fluid bed reactor of the present invention.

As shown in FIG. 1, the fluid bed reactor 1 of the present invention comprises a furnace reactor 50 which is in turn comprised of three chambers in communication with each other. The lower furnace chamber 8, the reaction chamber, is a cylindrical-shaped graphite tube with a closed bottom and a machined top. The middle furnace chamber 12 is a cylindrical-shaped graphite tube which is machined at the top and bottom to sleeve fit securely with the lower furnace chamber 8 and the upper furnace chamber 30. The upper furnace chamber 30 is a cylindrical-shaped graphite tube machined for sleeve fit on both ends. The entire furnace is supported by four steel columns 46. All metallic parts are kept at a safe distance from the induction coil 15, described below.

The heat input is provided by a thirty-seven turn induction coil 15, surrounding the lower furnace chamber 8, which heats a susceptor 11. The susceptor is a long graphite cylinder with an open bottom and an open top which is positioned within the area bound by the induction coil 15 and the lower furnace chamber 8. Insulation 5 is provided in the space between the induction coil 15 and the susceptor 11, preferably by Thermax carbon powder. Carbon felt 17 is used as insulation around the top portion of the induction coil 15. Wood planks 9 are positioned on the side of the induction coil 15 furthest from the susceptor 11 to support the induction coil 15 and to hold them in place. Carbon black 7 provides an additional source of insulation in the reactor 1 for efficient heating. In operation, the susceptor 11 induces or draws energy from the induction coil 15 and heats the lower chamber 8 by radiation. The susceptor 11 acts as a second wall of the reaction chamber in case of rupture of the first wall. Rupture is common when performing this type of process because the abrasive agglomerates erode the wall of the chamber. A rupture in the wall can cause heat to escape, which may injure workers in the area. It may even cause an explosion, damaging the reactor, the surrounding equipment and having the potential to critically harm personnel.

The fluidized bed 43 is positioned within the lower furnace chamber 8. When the fluid bed reactor 1 is operating under normal operating conditions, the fluidized bed spans the middle portion of the induction coil 15.

For regulated continuous charging, the feed or material to be reacted is introduced into the fluid bed reactor 1 by way of a weighted supply bin or hopper 41. A screw feeder 40 connected to the hopper by a flexible chute 42 transports the feed down a long graphite feed chute 28 to the feed chute end 29 located within the middle furnace chamber 12. The feed then free falls into the lower furnace chamber 8 where treatment will occur.

At the same time, fluidizing gas is supplied from the top of the furnace 50 through a graphite inlet line or conduit 2 which extends from the top of furnace 50 through the upper 30 middle 12 and lower 8 furnace chambers to a bubble cap 60 located within the lower furnace chamber 8 and positioned below the fluidized bed or reaction zone 43. The number of joints in the gas conduit line 2 have been minimized in order to avoid gas leaks. Introduction of the fluidizing gas from the top of the furnace and through the zone heated by the induction coil 15 results in the gas attaining a very high temperature before entering the fluidized bed 43. The heated gas enters the bubble cap 60 through the top.

Figure 2:
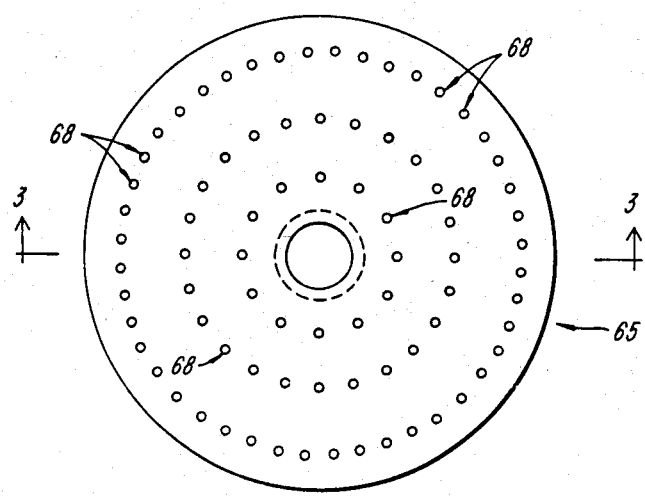
FIG. 2 is a plan view of the lid of the bubble cap of the fluid bed reactor of the present invention.
Figure 3:
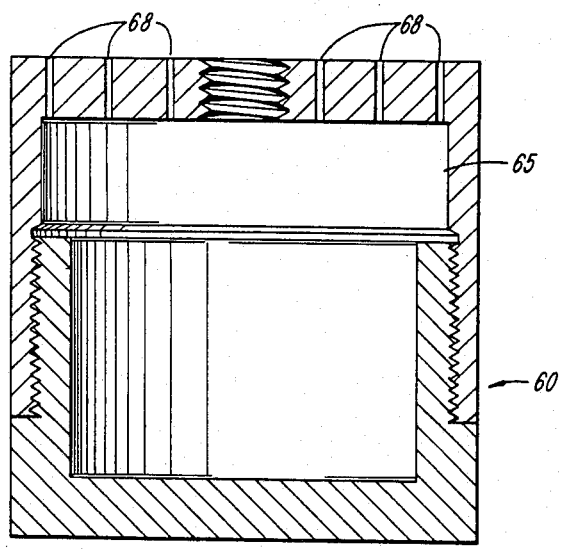
FIG. 3 is a vertical sectional view of the bubble cap of the fluid bed reactor of the present invention.

FIGS. 2 and 3 illustrate the bubble cap 60 in greater detail. The bubble cap 60 comprises a graphite chamber having a graphite top or lid 65 fitted to the chamber by use of a screw joint. The lid of the bubble cap 65 is formed with a plurality of holes 68 to allow for escape of the hot fluidizing gas therethrough. The inlet line 2 for the fluidizing gas communicates with and terminates in the lid 65 of the bubble cap 60. The bubble cap is positioned at the lower end of the heating zone with the fluidizing gas being delivered to the bubble cap from a source above the heating zone through a conduit 2 with the gas being heated within the conduit as the gas passes through the entire heating zone.

Thus in operation, the fluidizing gas descends through the inlet line 2 into the bubble cap 60. It then rises up through the lid 65 of the bubble cap into the reaction chamber 8. The rising preheated fluidizing gas causes the feed which has been released from the end of the feed chute 29 to fluidize as it remains in the reaction chamber 8. More importantly, the rising exhaust gas begins to lose heat, which is transferred to the fluidizing gas coming down the inlet line 2 to heat it. This transfer helps in maintaining the reactor at a temperature not previously achieved in fluid bed reactors. This countercurrent heat transfer helps in maintaining constant temperatures between the gas and solids resulting in constant conversions. The temperature can be maintained at up to 2000° C. in the reaction chamber 8, as indicated by the pyrometer (not shown), which can be checked through the sight tube 47.

The feed remains in the reaction chamber 8 for a specified amount of time determined by the quality of the product desired. The product is continuously discharged by overflow through a discharge chute plug 4 in the wall of the lower furnace chamber 8 near the surface of the fluidizing bed 43. The hot product is discharged through the product discharge chute 3 (in the discharge chute plug 4) which extends from the reaction chamber 8 into a rotating water cooled cylinder 24 positioned below the furnace 50 and within the steel frames 46. The cooled product overflows from the cooled cylinder 24 through a weight actuated dumper 25 positioned below and in communication with said cooled cylinder 24 and supported by said steel frame 46. Water cooling coils 62 surround said cooled cylinder 24 to assist the cooling process. The rotary cooler may be purged with an inert gas such as nitrogen so that the product does not become oxidized during cooling.

The hot fluidizing gas from the reaction chamber 8 is led through a water cooled connector tube 61 to the cyclone assembly (not shown) which separates the entrained solids. Water cooling coils 62 surround the connector tube to effect cooling. The cyclone also serves the additional purpose of burning any carbon monoxide in the furnace gas. The cyclone/afterburner is lined with insulation to isolate the gases leaving the cyclone at 300° C.

The fluid bed reactor assembly is cooled by 5 cooling water lines. A line (not shown) with a capacity of 30 gpm is used for cooling the power supply (not shown) of the induction coil 15. There are four other parallel lines: an induction coil line for cooling the induction coil 15; a furnace line for cooling the upper furnace chamber 30; a connector tube assembly line for cooling the connector tube assembly; and a rotary drum line for cooling the rotary drum 24. These cooling lines are each marked 62 on the accompanying drawing. The total cooling water requirement of this furnace is 43 gpm.

This reactor 1 is superior to known fluidized bed reactors because of the way the gas is introduced into the reaction chamber. The gas is introduced from the top of the reactor and travels downward toward the bubble cap. As it is traveling downward, the gas is heated by outgoing exhaust gases by countercurrent heat transfer. By countercurrent heat transfer is meant that heat that is lost from the exhaust gas rising from the reactor is transferred to the gas traveling down inlet line 2 toward the bubble cap so there is a very efficient heating system within the reactor.

As stated above, the method and apparatus described herein are particularly useful for the continuous preheating of hot nitrogen gas for conversion of agglomerates of aluminum oxide and carbon to high purity, ultrafine aluminum nitride powder. Initially, agglomerates uniform in both size, porosity and chemical composition are formed, consisting of a stoichiometric mixture of alumina and carbon with the addition of a small amount of catalyst. For example, to make a batch of 60 lbs of feed, 73.5 wt % of alumina, 26.0 wt % carbon (Thermax) and 0.5 wt % of calcium fluoride are dry mixed in a Eirich mixer for five minutes at a high setting, to intimately blend the mixture. Agglomeration is accomplished by wet mixing with 12 wt % of polyvinyl alcohol solution (25% by volume polyvinyl alcohol and 75% by volume water) for four minutes at a high setting. The four minutes includes three minutes required to add the polyvinyl alcohol solution. The agglomerated feed is dried in an oven at 120° C. in a pan. The dry agglomerates are sieved through 14 and 70 mesh. The above-mentioned procedure results in 80 to 85% of the agglomerate in $-14/+70$ size fraction with $d_{50}$ of approximately 35 mesh. The pellets must be uniform in size, chemical composition and porosity to insure a high degree of conversion of the agglomerates without excessive grain growth.

The as-formed agglomerates are then furnaced in a precisely controlled manner in the fluid bed reactor of the present invention. The gas velocity chosen for fluidation of the particles is based on the mean particle size. A gas flow rate of two standard cubic feet per minute (SCFM) is appropriate since this flow rate results in the minimum fluidization velocity for a mean agglomerate size of 500 microns. The pellets will have a residence time in the fluid bed of from 3 to 20 hours depending on the temperature and the desired level of conversion. The pellets are charged at the rate of 0.5 to 6 lbs/hr, preferably 3.0 lbs/hr, through the graphite feed chute into the reaction chamber. The reaction temperature is chosen to achieve the desired friability, and the reaction is usually conducted below 1850° C., preferably in the range of 1600–1800° C. The as-reacted agglomerates are then milled at the rate of 15 lbs/hr.

Copending patent application, Ser. No. 918980 filed 10/15/86 entitled "Process and Apparatus for the Continuous Production of High-Purity, Ultra-Fine, Aluminum Nitride Powder by the Carbo-Nitridization of Alumina" to J. Kim et al, filed on even date herewith, the teachings of which are incorporated herein by reference, further illustrates a process in which utilization of the fluid bed reactor of the present invention is particularly desirable.

Various changes and modifications of the invention can be made and, to the extent that such modifications incorporate the spirit of this invention, they are intended to be included within the scope of the appended claims.

What is claimed is:

1. A process for the continuous preheating of hot fluidizing gas for the treatment of refractory materials comprising:
   providing a reaction zone;
   heating the reaction zone by heating means;
   allowing a particulate solid to pass into the reaction zone from the top of the reaction zone;
   passing fluidizing gas within a conduit through the entire length of the reaction zone in a direction the same as the direction in which the particulate solid is passing into the reaction zone; and
   causing the gas to ascend from below the reaction zone in a direction counter to the direction in which the particulate solid is passing and counter to the direction in which the incoming fluidizing gas is travelling to fluidize the particulate solid and to preheat up to a temperature of 2000° C. the fluidizing gas passing within said conduit through the entire length of the reaction zone in a direction the same as the direction in which particulate solid is passing to the reaction zone.

2. The process of claim 1 wherein the heating means are induction coils surrounding the reaction zone and a susceptor surrounding the reaction zone and the induction coils, wherein the susceptor draws energy from the induction coils and heats the reaction zone by radiation.

3. The process of claims 1 wherein the fluidizing gas is caused to ascend from below the reaction zone by a bubble cap comprising a chamber with a lid having a plurality of holes.

* * * * *